B. BORZYKOWSKI.
APPARATUS FOR THE PRODUCTION OF FILMS.
APPLICATION FILED AUG. 18, 1913.
1,090,679.
Patented Mar. 17, 1914.
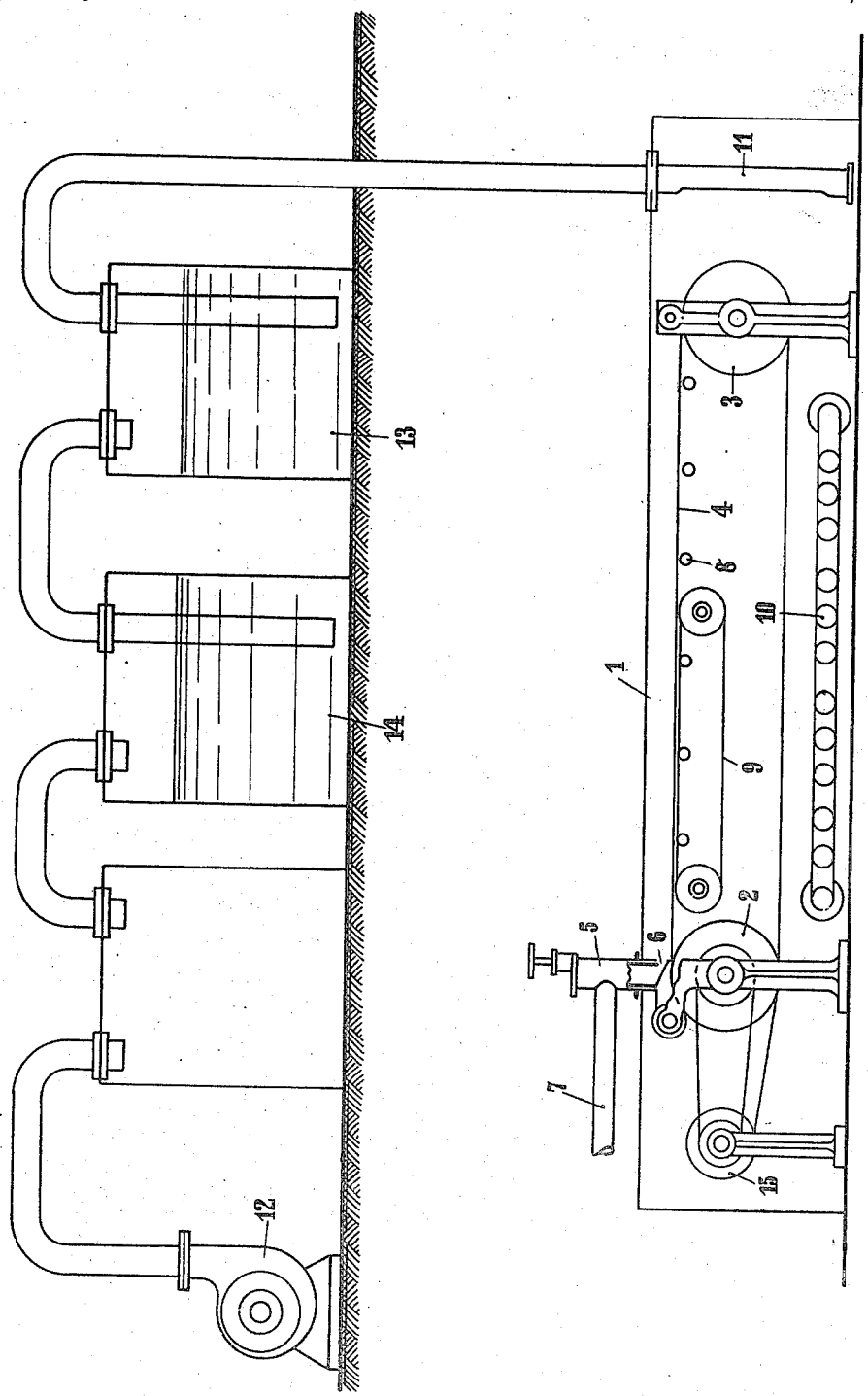
Witnesses:
Inventor:

UNITED STATES PATENT OFFICE.

BENNO BORZYKOWSKI, OF BERLIN, GERMANY.

APPARATUS FOR THE PRODUCTION OF FILMS.

1,090,679.  Specification of Letters Patent.  Patented Mar. 17, 1914.

Application filed August 18, 1913. Serial No. 785,327.

*To all whom it may concern:*

Be it known that I, BENNO BORZYKOWSKI, a subject of the Russian Emperor, residing at Berlin, Germany, have invented certain new and useful Improvements in Apparatus for the Production of Films; and I do hereby declare the following to be a full, clear, and exact description of the invention, such as will enable others skilled in the art to which it appertains to make and use the same.

The apparatus forming the subject of the present invention is designed for carrying out the known process for the production of celluloid in the form of films or bands, in which the solution is carried upon a continually moving endless transporter band as a thin coating, so that the solvent evaporates, and that the film or band of celluloid can be passed from the transporter band to a device for rolling it up.

The essential feature of my apparatus consists in the fact that the continually moving transporter band upon which the solution to make the celluloid film is poured in the form of a thin coating as well as the winding device upon which the finished film is wound is located in a completely closed chamber or channel kept at a suitable temperature; the vapors forming in this space through the evaporation of the solvent, being pumped away. As compared with the production of films upon open or half inclosed endless transporter bands, this arrangement renders it possible to recover the solvent. As is well-known volatile solvents can only be recovered by condensation when the vapors pumped away are as free as possible from air, a condition which is here obtained by completely closing in the apparatus from the entry of air.

It has already been proposed in a dipping process for producing articles of small size to work in an exhausted chamber to enable the solvent to be recovered. This process is, however, not applicable for the production of rolls of film which have to be produced in lengths of several hundred meters, as an exhausted chamber of about 50 meters in length would have to be provided for the purpose, in order to enable continuous working to be obtained, and this is not practicable. Besides vacuum apparatus of such a description would not be suitable for the manufacture of films, as the work has to be carried on with solvents which boil at a low temperature, so that even with a small amount of vacuum the solvent would begin to boil, and films with numerous air bubbles would be the result. An arrangement in which the whole apparatus is protected from the entry of air from the outside has moreover, irrespective of its economical and hygienic advantages, the further advantage that the product thereby obtained has appreciably better properties than that obtained in the ordinary way with apparatus which is not inclosed. Bands of film as produced hitherto often show small air bubbles or irregularities. These are the result of air currents above the band of film and of the consequent uneven evaporation of the solvent.

As has been proved by practical experiment a film which has been produced upon an apparatus constructed according to the present invention possesses absolute uniformity of surface and freedom from air bubbles.

In the drawings an apparatus made according to my invention is shown diagrammatically.

1 is a closed chamber within which is an endless transporter band 4 continually driven and passing around rollers 2 and 3. Above the transporter band where it leaves the roller 2 is located in a known manner a feeding apparatus 5 with an outlet orifice 6, the size of which can be regulated, from which orifice the solution for producing the material required, celluloid for instance, is fed and spread in the form of a thin coating on the band 4. The solution is passed through a closed tube 7 to the feeding apparatus 5. The upper portion of the transporter band 4 is supported by means of rollers 8 in order to prevent it sagging. At the forward end of the transporter band 4 is provided a suitable supporting table or, in order to avoid friction, there may be provided a supporting band 9 moving at the same speed as the transporter band, since it is found from experience that at the forward end of the transporter band 4 there is a special tendency to sagging. Radiators 10 are provided for producing the necessary heat according to the thickness of the coating of solution and according to the properties of the solvent employed.

At the rear end of the chamber or of the channel 1 is provided an exhaust pipe 11 which enables the evaporated solvent to be drawn away by means of a fan or rotary pump 12. Between the rotary pump 12 and the exhaust pipe 11 separating vats 13 and 14 are provided which may for instance be filled with a suitable neutral fluid and may serve for the reception and precipitation of the solvent removed. At the forward end of the chamber or of the channel 1 is a winding device 15 which removes the material of the band or film from the underside of the transporter band and rolls it up.

With the apparatus just described all escape of noxious vapors into the open air is prevented as well as all risk of fire and all unnecessary loss of the solvent.

What I claim as my invention and desire to secure by Letters Patent of the United States of America is:—

1. An apparatus for the manufacture of film comprising an endless band for receiving the dissolved material, a plurality of rollers arranged beneath the upper portion of said band to support the same and prevent sagging, an endless supporting band mounted at the forward portion of said first-named band for assisting to prevent sagging, means for receiving the film from said first-named band, heating means for driving off the solvent from the material, a casing for inclosing all of said above-named elements, and means for removing the vaporized solvent from said casing.

2. An apparatus for the manufacture of film comprising an air-tight casing, a pair of continuously-rotating rollers supported in spaced relation in said casing, an endless transporter band running over said rollers, a nozzle projecting through said casing above one of said rollers for delivering the dissolved material to said transporter band, a plurality of rollers arranged beneath the upper portion of said transporter band to support the same and prevent sagging, an endless supporting band running over the rollers in proximity to said nozzle and assisting to prevent sagging of said transporter band, a winding device mounted in said casing in front of said transporter band for receiving the film from the same, radiators arranged on said casing below said endless transporter band for producing the heat necessary for driving off the solvent, and means for removing the vaporized solvent from said casing.

In testimony whereof, I affix my signature, in presence of two witnesses.

BENNO BORZYKOWSKI.

Witnesses:
 HENRY HASPER,
 ARTHUR SCHROEDER.